(12) United States Patent
Wang

(10) Patent No.: US 12,285,371 B2
(45) Date of Patent: Apr. 29, 2025

(54) ANTI-PINCH SYSTEM FOR AN ELECTRIC SEAT

(71) Applicants: Andy Wang, Taichung (TW); Yueh-Cheng Tsay, Taichung (TW)

(72) Inventor: Andy Wang, Taichung (TW)

(73) Assignees: SOFLEX FURNITURE CO LTD, Tortola (VG); Yueh-Cheng Tsay, Taichung (TW)

( * ) Notice: Subject to any disclaimer, the term of this patent is extended or adjusted under 35 U.S.C. 154(b) by 218 days.

(21) Appl. No.: 18/203,665

(22) Filed: May 31, 2023

(65) Prior Publication Data

US 2024/0237831 A1 Jul. 18, 2024

(30) Foreign Application Priority Data

Jan. 18, 2023 (TW) .................................. 112200714

(51) Int. Cl.
| | |
|---|---|
| *A61G 5/14* | (2006.01) |
| *A47C 1/024* | (2006.01) |
| *A47C 1/032* | (2006.01) |
| *A47C 1/034* | (2006.01) |
| *A47C 7/14* | (2006.01) |
| *A47C 7/50* | (2006.01) |
| *A47C 31/00* | (2006.01) |
| *G05B 9/02* | (2006.01) |

(52) U.S. Cl.
CPC .............. *A61G 5/14* (2013.01); *A47C 1/0242* (2013.01); *A47C 1/0244* (2013.01); *A47C 1/03211* (2013.01); *A47C 1/034* (2013.01); *A47C 7/142* (2018.08); *A47C 7/506* (2013.01); *A47C 31/008* (2013.01); *G05B 9/02* (2013.01); *A61G 2203/726* (2013.01)

(58) Field of Classification Search
CPC ...... A61G 5/14; A61G 2203/726; A61G 5/10; A47C 1/0242; A47C 1/0244; A47C 1/03211; A47C 1/034; A47C 7/142; A47C 7/506; A47C 31/008; G05B 9/02
See application file for complete search history.

(56) References Cited

U.S. PATENT DOCUMENTS

| | | | | |
|---|---|---|---|---|
| 5,566,504 A | * | 10/1996 | Pitel ........................ | E05F 15/47 49/27 |
| 5,728,984 A | * | 3/1998 | Miller ..................... | E05F 15/47 200/83 Z |
| 5,931,532 A | * | 8/1999 | Kemmerer ............... | A61G 5/14 297/DIG. 10 |

(Continued)

*Primary Examiner* — Robert Canfield
(74) *Attorney, Agent, or Firm* — WPAT, PC

(57) ABSTRACT

An anti-pinch system for an electric seat includes a plurality of infrared sensing modules, a seat cushion hose, a footrest hose, a pressure sensor, at least one linear actuator, a central processing unit, a power module and a control module. When the user operates the electric seat to act, the plurality of infrared sensing modules and the pressures sensor synchronously sense whether an obstacle is under the electric seat. If an obstacle exists under the electric seat, the central processing unit will control the at least one actuator to stop or to reversely act. When the user cannot perceive obstacles by themselves, the electric seat can be automatically prevented from pinching obstacles, thus avoiding damaging the obstacles or the electric seat.

8 Claims, 4 Drawing Sheets

(56) References Cited

U.S. PATENT DOCUMENTS

| | | | | |
|---|---|---|---|---|
| 11,761,253 B2* | 9/2023 | Soderqvist | ............... | E05F 15/43 |
| | | | | 49/28 |
| 11,786,040 B1* | 10/2023 | Porter | .................... | A47C 7/727 |
| | | | | 297/217.4 |
| 2006/0103209 A1* | 5/2006 | Olcheski | .................. | A61G 5/14 |
| | | | | 297/330 |
| 2008/0007103 A1* | 1/2008 | Welles | ................. | A61B 5/6887 |
| | | | | 297/330 |
| 2016/0166453 A1* | 6/2016 | Furman | ................. | A61G 7/018 |
| | | | | 700/275 |
| 2019/0380896 A1* | 12/2019 | Wang | ................... | A47C 1/0244 |
| 2023/0184022 A1* | 6/2023 | Eliasson | ................ | E05F 15/70 |
| | | | | 49/31 |

* cited by examiner

ANTI-PINCH SYSTEM FOR AN ELECTRIC SEAT

CROSS REFERENCE TO RELATED APPLICATIONS

The present application claims priority to Taiwan application No. 112200714, filed on Jan. 18, 2023, the content of which is hereby incorporated by reference in its entirety.

BACKGROUND OF THE INVENTION

1. Field of the Invention

The present invention relates to a safety system for a seat, especially an anti-pinch system for an electric seat that uses multiple sensors to sense the bottom of the electric seat to prevent the electric seat from pinching obstacles.

2. Description of the Related Art

With the advent of the aging society, more and more attention is paid to devices suitable for the elderly. The demand for these devices is increasing, and electric lift seats are one example. An adjustable frame is mounted on a current electric lift seat, and the adjustable frame is connected to a seat cushion, a seat back, etc. of the seat. The adjustable frame has a frame base for setting on the ground. Users can control the extension and retraction of the adjustable frame electrically by a remote, and then adjust the lifting of the seat. For example, first raise the height of the seat cushion so that the elderly can sit on it effortlessly, then slowly lower the height of the seat cushion and adjust the inclination angle of the seat back the headrest. Even some electric lift seats are mounted with adjustable footrests, so the feet of the elderly can be arched and relaxed. And the elderly can adjust to the most comfortable seat condition for themselves according to their own habits.

However, when the user sits on the seat, the area under the seat becomes a blind area for the user, and it is difficult for users to notice whether there is an obstacle in the blind spot by themselves. And the blind area normally is the position where the seat is prone to pinch people or objects. If children, pets, etc. are in the blind area or will enter the blind area, the user directly controls and adjusts the seat without paying special attention, adjusting the height of the seat cushion and the height of the footrest, etc. At this time, the seat is likely to directly pinch the children or pets, causing injury to the children or pets. In addition, the obstacle may also be balls, toys of the children, etc. If such obstacles appear in the blind area and are not eliminated immediately, the obstacles may also be pinched to breakage during the operation of the seat, or the seat continues to pinch the obstacle, damaging the seat itself.

It can be seen from the above that no matter what kind of obstacles appear in the area under the seat, as long as the user directly adjusts the seat to activate it without paying attention, it may cause damage to the obstacle; especially when the obstacle is a child or a pet, etc., the damage might be irreparable.

SUMMARY OF THE INVENTION

Considering that when using the existing electric lift seat, the users cannot perceive whether an obstacle exists around the bottom of the electric lift seat by themselves, such that the obstacle may be pressed or pinched continuously during operation of the electric lift seat, resulting in injuries of the obstacles or damage to the electric lift seat itself. The present invention provides an anti-pinch system for an electric seat. The electric seat includes a seat back, a seat cushion, a footrest and an adjustable frame connected to the seat back, the seat cushion and the footrest, and a bottom surface of the footrest includes a first side and a second side opposite each other; the anti-pinch system for an electric seat includes:
  a plurality of infrared sensing modules mounted on a frame base of the adjustable frame, and each infrared sensing module including:
    an infrared emitter for emitting an infrared signal; and
    an infrared receiver for receiving the infrared signal and accordingly transmitting an infrared sensing signal;
  a seat cushion hose mounted along an edge of the bottom surface of the seat cushion and filled with a first fluid;
  a footrest hose filled with a second fluid, and including:
    a plurality of first bending sections mounted near the first side of the bottom surface of the footrest;
    a plurality of second bending sections mounted near the second side of the bottom surface of the footrest;
    a plurality of connecting sections; each connecting section connected between each first bending section and each second bending section;
  a pressure sensor configured to detect a total pressure of the first fluid and the second fluid to generate a pressure sensing signal;
  at least one linear actuator connected to the adjustable frame to control the seat back, the seat cushion and the footrest of the electric seat to act;
  a central processing unit electrically connected to the plurality of infrared sensing modules, the pressure sensor and the at least one linear actuator to receive the infrared sensing signal and the pressing sensing signal; when the central processing unit does not receive the infrared sensing signal within a preset time or determines the pressure sensing signal has changed, the central processing unit controls the at least one actuator to stop acting or to reversely act;
  a power module electrically connected to the central processing unit;
  a control module electrically connected to the central processing unit to transmit a control signal to the central processing unit.

When the user operates the electric seat to act, the plurality of infrared sensing modules and the pressures sensor of the anti-pinch system for an electric seat of the present invention synchronously and dynamically sense. When there is an obstacle existing in the central bottom position of the seat cushion and blocks one of the infrared signals, or when the seat cushion hose or the footrest hose is pressed to deform by the obstacle to change the sum of pressure of the first fluid and the second fluid, causing the central processing unit not to receive said one of the infrared sensing signals within the preset time, or received pressure sensing signal changes, the central processing unit will control the at least one linear actuator to stop acting or to reversely act. When the user cannot perceive obstacles by themselves, the electric seat can be automatically prevented from pinching obstacles to avoid injuring the obstacles or damaging the electric seat.

DETAILED DESCRIPTION OF THE INVENTION

Figure 1:
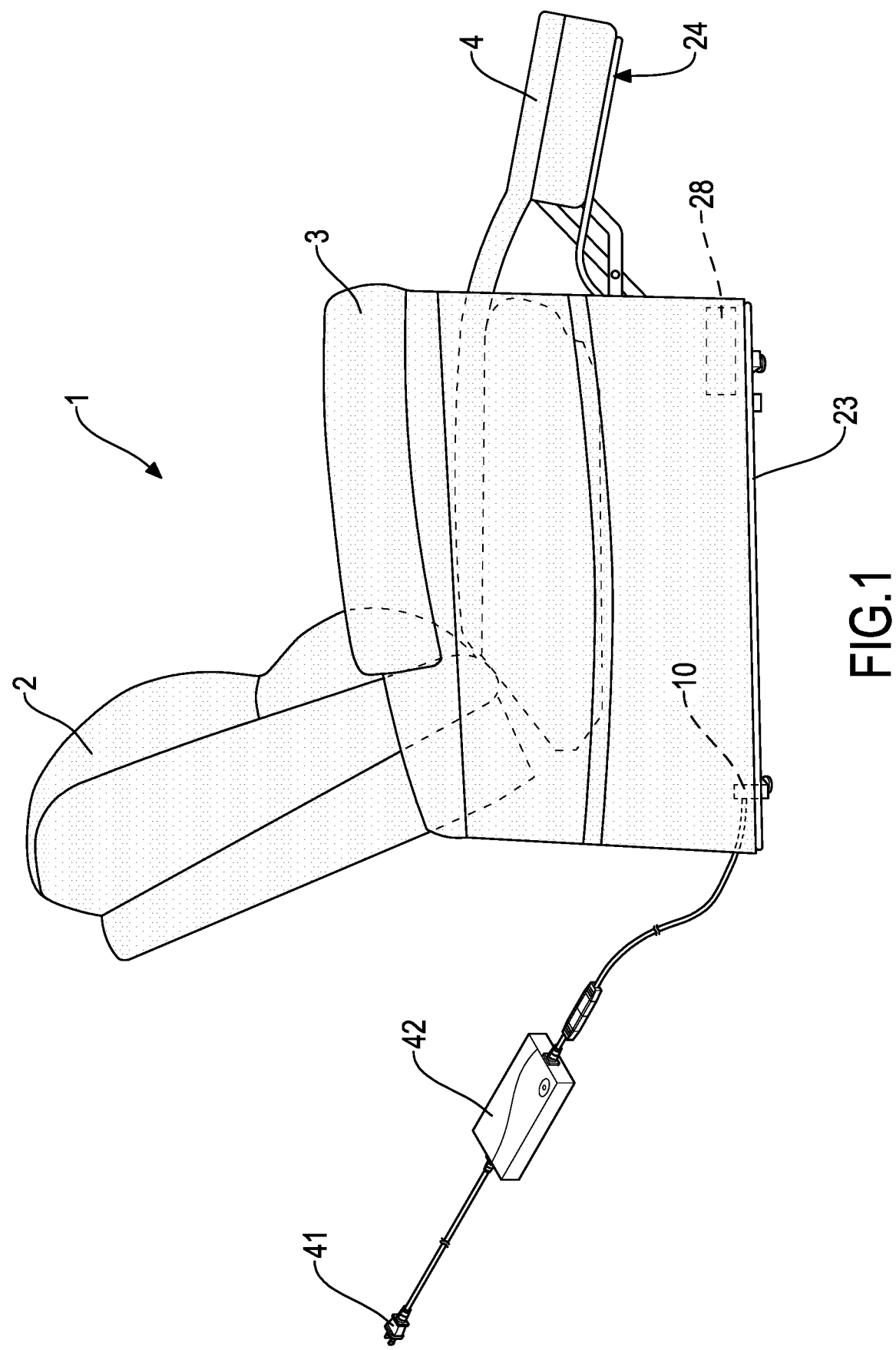
FIG. 1 is a schematic diagram of an anti-pinch system of the present invention adapted to an electric seat.
Figure 2:
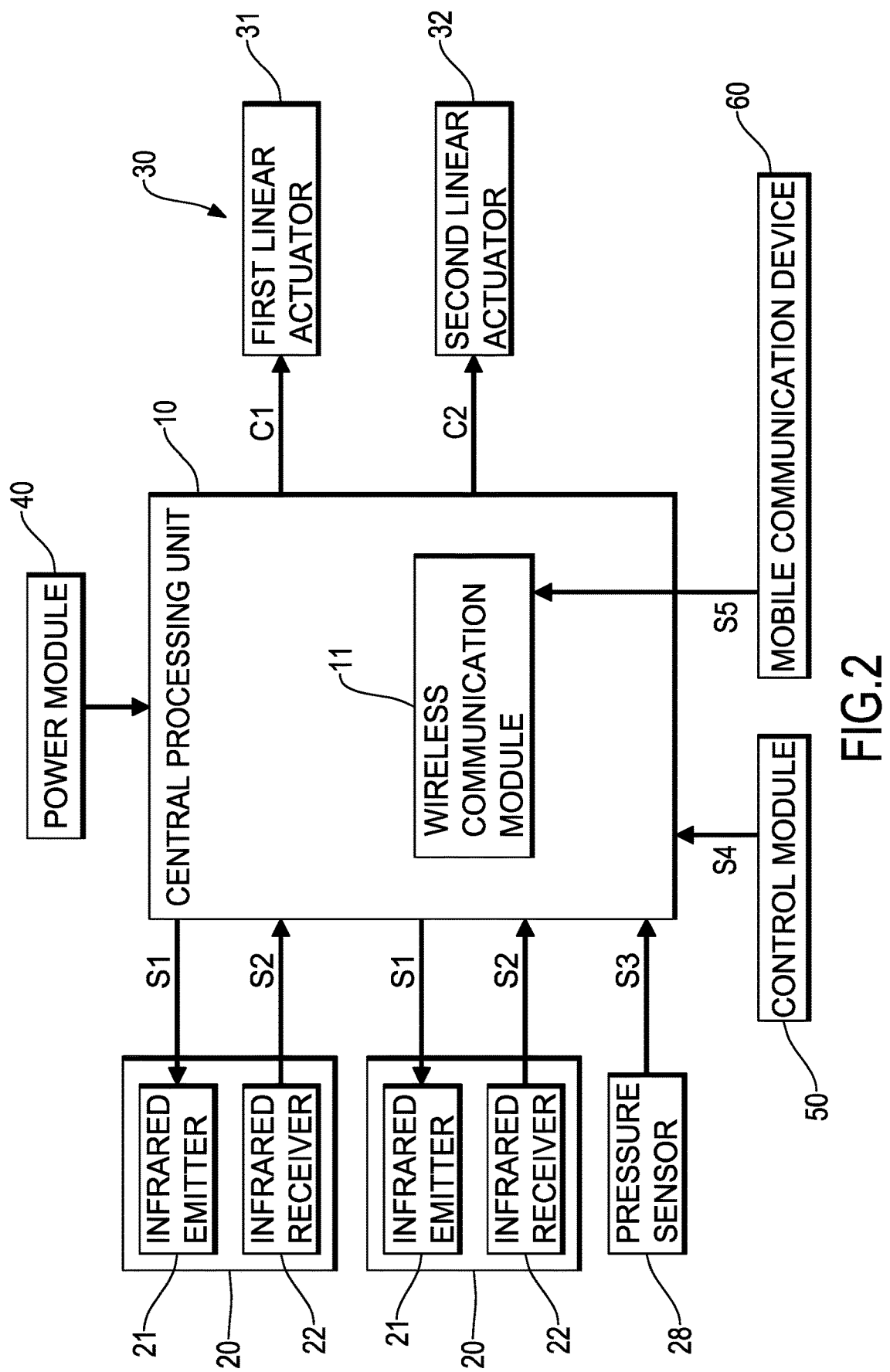
FIG. 2 is a circuit block diagram of the anti-pinch system for an electric seat of the present invention.

In order to understand the technical characteristics and practical effects of the prevent invention in detail, and accomplish them according to the content of the invention, the detailed description is as follows with the embodiment shown in the figure:

The present invention is an anti-pinch system for an electric seat 1. With reference to FIG. 1, the electric seat 1 includes a seat back 2, a seat cushion 3, a footrest 4 and an adjustable frame connected to a bottom of the seat cushion 3, the seat back 2 and the footrest 4, wherein a bottom surface of the footrest 4 has a first side and a second side opposite each other, and the adjustable frame has a frame base B. Since the electric seat 1 is not the technical characteristic of the present invention, the electric seat is not to be described in detail hereinafter. Referring to FIG. 2, the anti-pinch system for an electric seat of the present invention is mounted to the electric seat 1, and includes a central processing unit 10, a plurality of infrared sensing modules 20, a seat cushion hose 23, a footrest hose 24, a pressure sensor 28, at least one linear actuator 30, a power module 40 and a control module 50.

The central processing unit 10 is electrically connected to the plurality of infrared sensing modules 20, the pressure sensor 28, the at least one linear actuator 30, the power module 40 and the control module 50 respectively. In a preferred embodiment, the central unit 10 is a micro controller (MCU) to receive signals output from the plurality of infrared sensing modules 20, the pressure sensor 28 and the control module 50, and controls the at least one linear actuator 30 according to the signals aforementioned.

Figure 3:
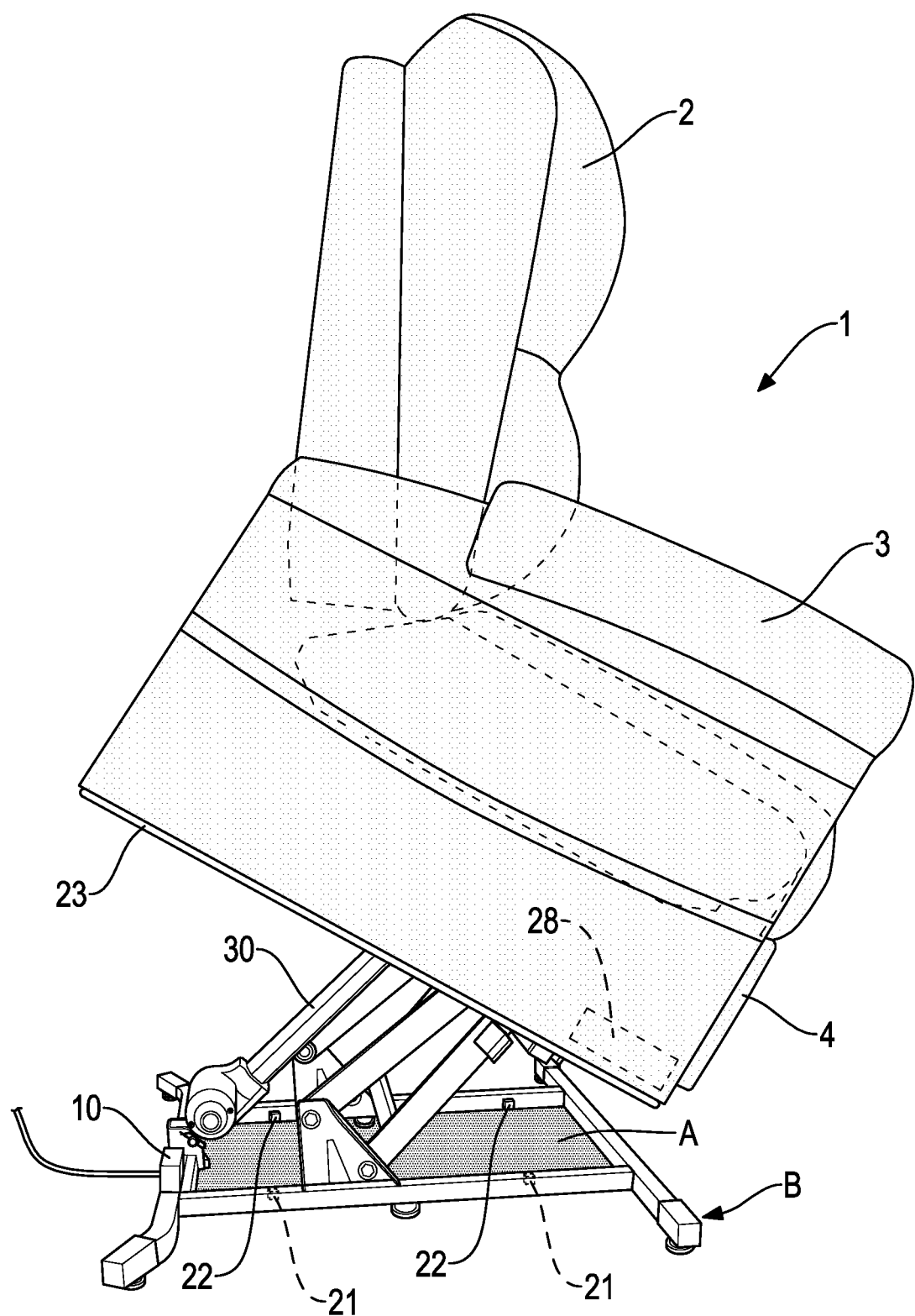
FIG. 3 is a schematic diagram of the anti-pinch system of the present invention adapted to the electric seat, wherein the electric seat is in a rising state.

Referring to FIG. 3, the plurality of infrared sensing modules 20 are mounted on the frame base B to detect whether an obstacle is under the electric seat 1. In particular, each infrared sensing module 20 includes an infrared emitter 21 and an infrared receiver 22. Each infrared emitter 21 and each infrared receiver 22 are electrically connected to the central processing unit 10 respectively. Each infrared emitter 21 emits an infrared signal according to a control emitting signal S1 output by the control processing unit 10. Each infrared receiver 22 receives the infrared signal and outputs an infrared sensing signal S2 to the central processing unit 10. The following description will use an infrared sensing module 20 to explain how to detect whether an obstacle is under the electric seat 1.

As shown in FIG. 3, the frame base B has a sensing area A, and the infrared emitter 21 and the infrared receiver 22 are respectively mounted on both sides of the sensing area A of the frame base B. The mounting location of each infrared emitter 21 corresponds to the mounting location of each infrared receiver 22. After the central processing unit 10 controls the infrared transmitter 21 to emit the infrared signal, the central processing unit 10 determines no obstacle in the sensing area A if the infrared receiver 22 receives the infrared signal and outputs the infrared sensing signal S2 to the central processing unit 10 within a preset time. On the contrary, if an obstacle is in the sensing area A and blocks the infrared signal, the central processing unit 10 will not receive the infrared sensing signal S2 from the infrared receiver 22 within the preset time, such that the central processing unit 10 controls the at least one linear actuator 30 to stop acting or to reversely act and makes the electric seat 1 enter a locked state.

Figure 4:
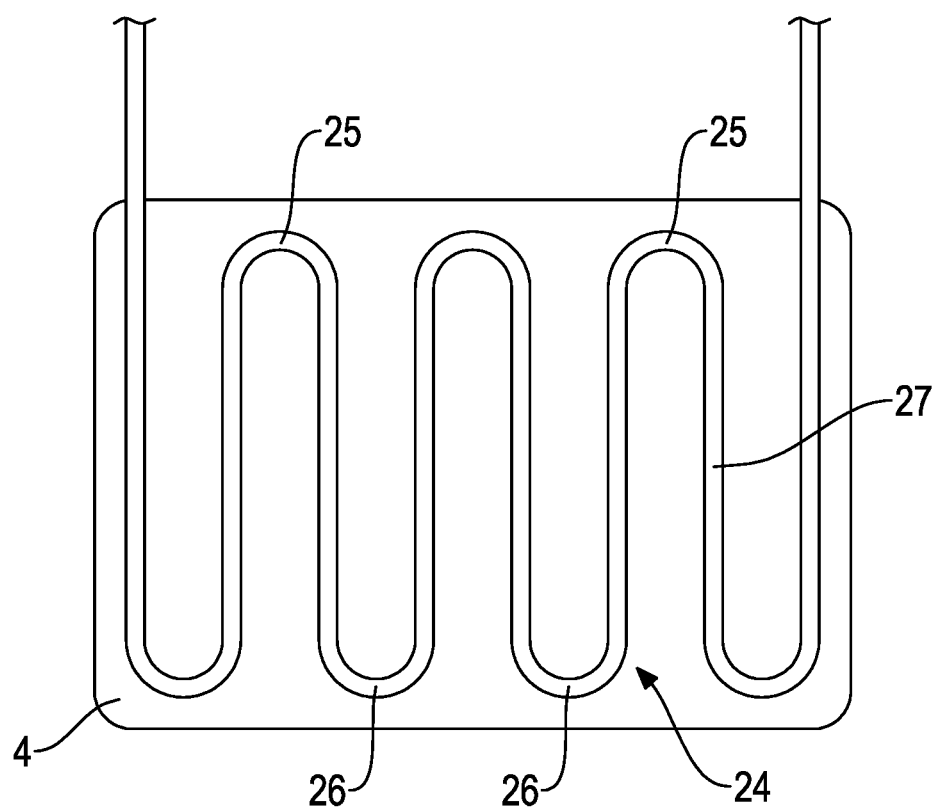
FIG. 4 is a schematic diagram of the footrest hose of the present invention mounted on the bottom surface of the electric seat.

Referring to FIG. 1, the seat cushion hose 23 is mounted on the bottom of the seat cushion 3. In particular, the seat cushion hose 23 is mounted along an edge of the bottom surface of the seat cushion 3 and filled with a first fluid. The footrest hose 24 is mounted on the bottom surface of the footrest 4 and filled with a second fluid; preferably, the footrest hose 24 is mounted on the bottom surface of the footrest 4 in multiple bends, such that most of the bottom surface of the footrest is covered by the footrest hose 24. In particular, please refer to FIG. 4: the footrest 24 includes a plurality of first bending sections 25, a plurality of second bending sections 26 and a plurality of connecting sections 27. The plurality of first bending sections 25 are mounted near the first side of the footrest 4, and the plurality of second bending sections 26 are mounted near the second side of the footrest 4, and each connecting section 27 is connected between each first bending section 25 and each second bending section 26.

The pressure sensor 28 is connected to the seat cushion hose 23 and the footrest 24 to detect a total pressure of the first fluid and the second fluid and accordingly generates a pressure sensing signal S3. As an example, the first fluid and the second fluid are gas, and the pressure sensor 28 is an air pressure sensor. The pressure sensor 28 is connected to an end of a main hose. The main hose is connected to the cushion hose 23 and the footrest hose 24 through one or more T-connecters. With the aforementioned connection relationship, the pressure sensor 28 detects the total pressure of the first fluid and the second fluid through the main hose to generate an electronic signal, wherein the electronic signal is the pressure sensing signal S3.

Prior to activation of the at least one linear actuator 30, the central processing unit 10 receives the pressure sensing signal S3 and obtains a total pressure value of the first fluid and the second fluid. When the at least one linear actuator 30 is activated, the pressure sensor 28 continuously senses air pressures of the first fluid and the second fluid. When the seat cushion hose 23 or the footrest hose 24 is pressed by an obstacle and deforms, the air pressure of the first fluid or the second fluid will change, so that the total pressure value sensed by the pressure sensor 28 will be changed. When the central processing unit 10 receives the pressure sensing signal S3 and determines that the pressure sensing signal S3 has been changed, the central processing unit 10 controls the at least one linear actuator 30 to stop acting or to reversely act.

The at least one linear actuator 30 is connected to the adjustable frame and is electrically driven to extend and retract to become an electric linear actuator. A lifting of the electric seat 1 is controlled through the extension and retraction of the at least one linear actuator 30. In a preferred embodiment, the at least one linear actuator 30 includes a first linear actuator 31 and a second linear actuator 32. The first actuator linear 31 and the second linear actuator 32 have different functions. For example, the first linear actuator 31 is configured to control the seat back 2 and is connected to the central processing unit 10 for receiving a first retractable signal C1. When the first linear actuator 31 extends and retracts, the extension and retraction of the first linear actuator 31 can control an inclined angle of the seat back 2 in conjunction, so that the user can choose a more upright sitting posture or a more laid-back posture. The second actuator 32 is configured to control the seat cushion 3 and the footrest 4 and is connected to the central processing unit 10 for receiving a second retractable signal C2. When the second linear actuator 32 extends and retracts, the extension and retraction of the first linear actuator 31 can control a lifting state of the seat cushion and the footrest in conjunction, so that the user can choose an appropriate seat height.

The power module 40 is connected to the central processing unit 10 to provide an operating power. The power module 40 includes a plug 41 and a transformer 42 as shown in FIG. 1. The plug 41 is configured to connect an external socket to receive an external power. The external power is transformed into a DC power supply through the transformer 42 to provide the required operating power of each component of the present invention.

The control module 50 can be a remote controller including a lift button, a seat back angle adjustment button, a reset button and an unlock button. The lift button is configured to control a lifting height of the electric seat 1. The seat back angle adjustment button is configured to adjust the inclined angle of the seat back 2. The reset button is configured to initialize the electric seat 1 to an original setting state, and the unlock button is configured to unlock the electric seat 1 from a locked state. In particular, when the user presses a button on the control module 50, the control module 50 transmits a first control signal S4 to the central processing unit 10, so that the central processing unit 10 outputs the first retractable signal C1 to the first linear actuator 31 according to the first control signal S4 or outputs the second retractable signal C2 to the second linear actuator 32. In this embodiment, the control module 50 is a wired remote controller connected to the central processing unit 10 through a wire. In another embodiment of the present invention, the control module 50 is a wireless remote controller connected to the central processing unit 10 through a wireless technology.

In a preferred embodiment, the central processing unit 10 includes a wireless communication module 11. The wireless communication module 11 can be a Bluetooth module. The wireless communication module 11 is used to communicate a mobile communication device 60 to control and operate the central processing unit 10, wherein the mobile communication device can be a mobile phone or a tablet. For example, the mobile communication device 60 is equipped with an application program (APP) displaying a reset icon and a unlock icon. When the user touches the reset icon or the unlock icon, the mobile communication device 60 transmits a second control signal S5 to the wireless communication module 11 to control the central processing unit 10, so that the central processing unit 10 controls the electric seat 1 to initialize or unlock the locked state according to the second control signal S5.

Taking FIG. 3 as an example, the user can use the control module 50 or the mobile communication device 60 to transmit a control signal to the central processing unit 10, so that the central processing unit 10 controls the at least one linear actuator 30 to act, and then adjusts the state of the electric seat 1. During the process of adjusting the electric seat 1, the plurality of infrared sensing modules 20 continuously detect whether an obstacle enters the central bottom position of the seat cushion 3; if an obstacle (such as a child, a pet, etc.) exists in the sensing area A and blocks a transmission path of one of the infrared signals, the central processing unit 10 will not be able to receive the infrared sensing signal S2. If the central processing unit 10 does not receive the infrared sensing signal S2 beyond the preset time, the central processing unit 10 transmits a retractable signal to the at least one linear actuator 30 to control the linear actuator 30 to stop acting or to reversely act, and the electric seat 1 enters a locked state. When the electric seat 1 is in the locked state, the electric seat 1 is not adjustable by the user. In this way, the electric seat 1 is prevented from pinching obstacles.

However, if the obstacle is not in the central bottom position of the seat cushion 3, for example, near the edge of the bottom surface of the seat cushion 3, and the user directly adjusts the state of the electric seat 1, the electric seat 1 may press the obstacle. In another situation, if a hand or a foot of a child is near the footrest 4 of the electric seat 1 when the footrest 4 is folding, the child may be injured. During the process of adjusting the electric seat 1, because the seat cushion hose 23 is mounted on the bottom surface of the seat cushion 3 and the footrest hose 24 is mounted on the bottom surface of the footrest 4 in the present invention, the pressure sensor 28 detects the total pressure value of the first fluid and the second fluid to generate the pressure sensing signal S3, so that the central processing unit 10 can determine whether an obstacle is in the aforementioned position by the pressure sensing signal S3. When the pressure sensing signal S3 is changed, the central processing unit 10 transmits a retractable signal to the at least one linear actuator 30 to control the linear actuator 30 to stop acting or to reversely act, and the specific implementation is as described above and will not be repeated. The present invention increases the safety during an adjustment process of the electric seat 1 through two protection mechanisms.

When the at least one linear actuator 30 stops acting or reversely act due to an obstacle under the electric seat 1, the user needs to remove the obstacle first, and then manually operates the control module 50 or the mobile communication device 60 to unlock the electric seat 1, so that the linear actuator 30 is able to extend or retract. In this way, the electric seat 1 is ensured not to press or pinch obstacles again.

In view of the above, the following descriptions are the characteristics of the anti-pinch system for an electric seat of the present invention.
1. When the at least one linear actuator 30 is actuated, the present invention uses a dual-sensing mechanism for synchronous dynamic sensing, which increases the comprehensiveness of sensing obstacles and reduces the pressing or pinching caused by the electric seat 1.
2. When the at least one linear actuator 30 stops acting or reversely acts due to an obstacle, the user needs to remove the obstacle and manually presses the unlock button to allow the electric seat 1 to unlock the locked state and continue to act. This can ensure that the linear actuator 30 is in the state of removing obstacles during an actuation process to prevent pinching obstacles, regardless that the obstacles are children, pets and other organisms or objects.
3. The present invention can use a wired remote controller to operate, and also use the mobile communication device 60 to perform wireless remote control, which increases convenience.

What is claimed is:
1. An anti-pinch system for an electric seat, the electric seat including a seat back, a seat cushion, a footrest and an adjustable frame connected to the seat back, the seat cushion and the footrest, and a bottom surface of the footrest including a first side and a second side opposite each other; the anti-pinch system comprising:

a plurality of infrared sensing modules mounted on a frame base of the adjustable frame, and each infrared sensing module including:
an infrared emitter for emitting an infrared signal; and
an infrared receiver for receiving the infrared signal and accordingly transmitting an infrared sensing signal;
a seat cushion hose mounted along an edge of the bottom surface of the seat cushion and filled with a first fluid;
a footrest hose filled with a second fluid, and including:
a plurality of first bending sections mounted near the first side of the bottom surface of the footrest;
a plurality of second bending sections mounted near the second side of the bottom surface of the footrest;
a plurality of connecting sections; each connecting section connected between each first bending section and each second bending section;
a pressure sensor configured to detect a total pressure of the first fluid and the second fluid to generate a pressure sensing signal;
at least one linear actuator connected to the adjustable frame to control the seat back, the seat cushion and the footrest of the electric seat;
a central processing unit electrically connected to the plurality of infrared sensing modules, the pressure sensor and the at least one linear actuator to receive the infrared sensing signal and the pressing sensing signal; when the central processing unit does not receive the infrared sensing signal within a preset time or determines the pressure sensing signal has changed, the central processing unit controls the at least one actuator to stop or to reversely act;
a power module electrically connected to the central processing unit;
a control module electrically connected to the central processing unit to transmit a control signal to the central processing unit.

2. The anti-pinch system as claimed in claim 1, wherein the at least one linear actuator includes:
a first linear actuator configured to control a inclined angle of the seat back of the electric seat; and
a second linear actuator configured to control a lifting state of the seat cushion and the footrest of the electric seat.

3. The anti-pinch system as claimed in claim 2, wherein the first linear actuator is connected to the frame of the sear back and receives a first retractable signal transmitted by the central processing unit, and the first retractable signal is configured to control the extension and retraction of the first linear actuator; and
the second linear actuator is connected to the frame of the seat cushion and the footrest and receives a second retractable signal transmitted by the central processing unit, and the second retractable signal is configured to control the extension and retraction of the second linear actuator.

4. The anti-pinch system as claimed in claim 1, wherein, when the at least one linear actuator is actuated, the pressure sensor continuously detects pressures of the first fluid and the second fluid.

5. The anti-pinch system as claimed in claim 1, wherein the control module includes an unlock button to unlock the electric seat.

6. The anti-pinch system as claimed in claim 1, wherein the control module is a wired remote controller connected to the central processing unit through a wire.

7. The anti-pinch system as claimed in claim 1, wherein the control module is a wireless remote controller wirelessly connected to the central processing unit.

8. The anti-pinch system as claimed in claim 1, wherein the central processing unit further includes a wireless communication module configured for a mobile communication device that controls the central processing unit.

* * * * *